United States Patent [19]

Mattson

[11] Patent Number: 4,700,546
[45] Date of Patent: Oct. 20, 1987

[54] BY-PRODUCT CHILLER AND METHOD FOR USING SAME

[75] Inventor: Glenn D. Mattson, Chanhassen, Minn.

[73] Assignee: Omaha Cold Storage Terminals, Omaha, Nebr.

[21] Appl. No.: 856,469

[22] Filed: Apr. 28, 1986

[51] Int. Cl.⁴ .................. F25D 17/02; F25D 25/02
[52] U.S. Cl. .......................................... 62/64; 62/381
[58] Field of Search .................... 62/63, 64, 65, 378, 62/381

[56] References Cited

U.S. PATENT DOCUMENTS

| | | |
|---|---|---|
| 2,456,124 | 12/1948 | Hoffman ............................ 62/63 |
| 2,794,326 | 6/1957 | Mencacci . |
| 2,942,429 | 6/1960 | Van Dolah et al. . |
| 3,015,219 | 1/1962 | Veyrie . |
| 3,092,975 | 6/1963 | Zebarth . |
| 3,097,501 | 7/1963 | Pappas . |
| 3,213,634 | 10/1965 | Granata . |
| 3,395,549 | 8/1968 | Grimes . |
| 3,410,101 | 11/1968 | Morris . |
| 3,426,546 | 2/1969 | Crane . |
| 3,446,030 | 5/1969 | Rubin . |
| 3,488,973 | 1/1970 | Harben, Jr. et al. . |
| 3,498,208 | 3/1970 | Longe et al. . |
| 3,555,838 | 1/1971 | Morris . |
| 3,623,331 | 11/1971 | Buyens . |
| 3,906,743 | 9/1975 | Schorsch et al. . |
| 3,992,899 | 11/1976 | Spahn . |
| 4,578,957 | 4/1986 | Cunningham . |

Primary Examiner—Henry A. Bennet
Attorney, Agent, or Firm—Zarley McKee, Thomte, Voorhees & Sease

[57] ABSTRACT

An improvement in packing plant by-products chillers which have an elongated revolvable cylindrical tank open at both ends for introduction of slaughterhouse by-products in one end, passing the same through the cylindrical tank while revolving the same and simultaneously moving chilled water therethrough, said improvements comprising a knife slashing the unit for use in association with the entry into said chiller, a strainer unit in association with the drain of liquid coolant from said unit, and an associated float valve for controlling liquid level pressure and flow within the system.

16 Claims, 11 Drawing Figures

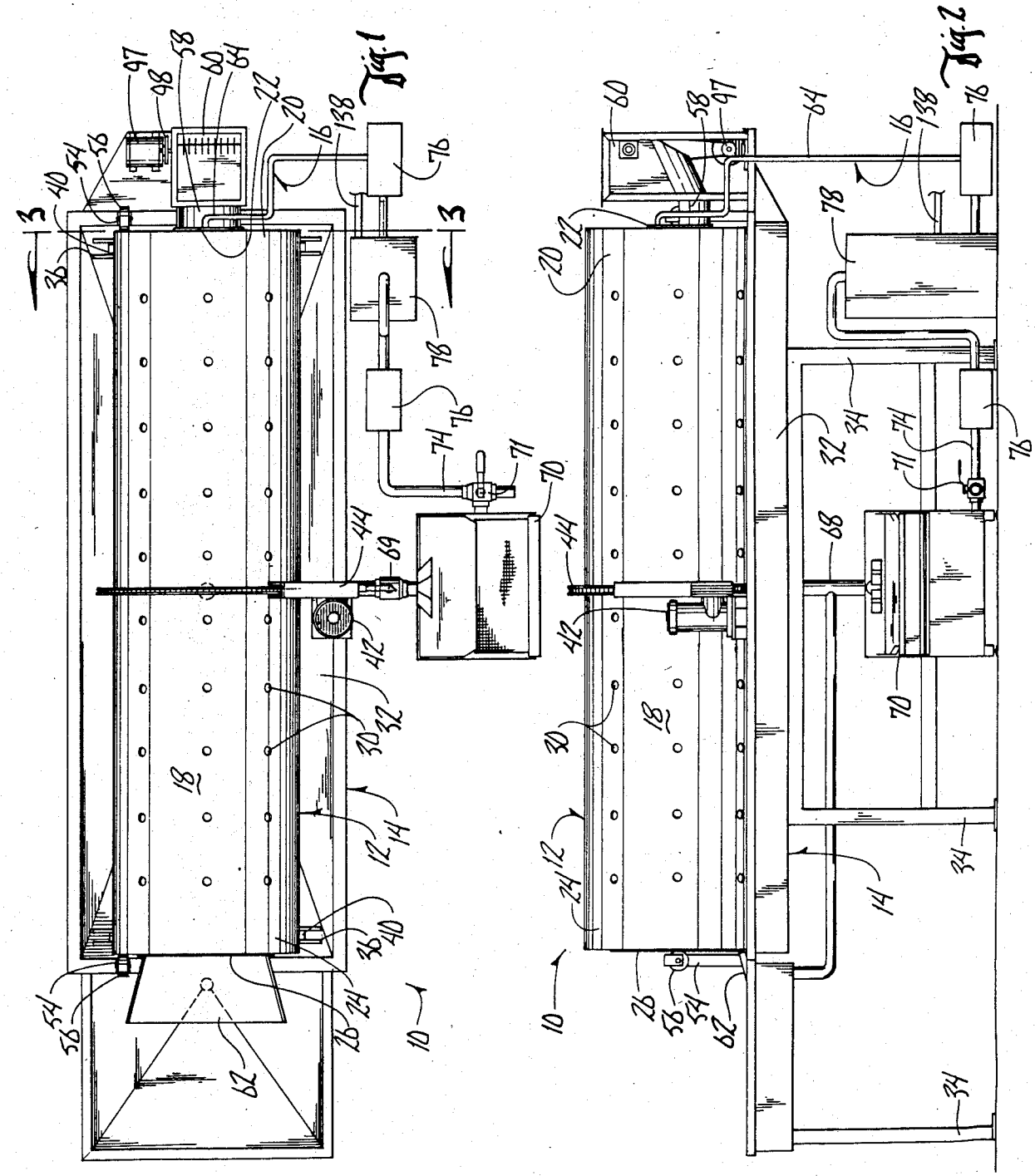

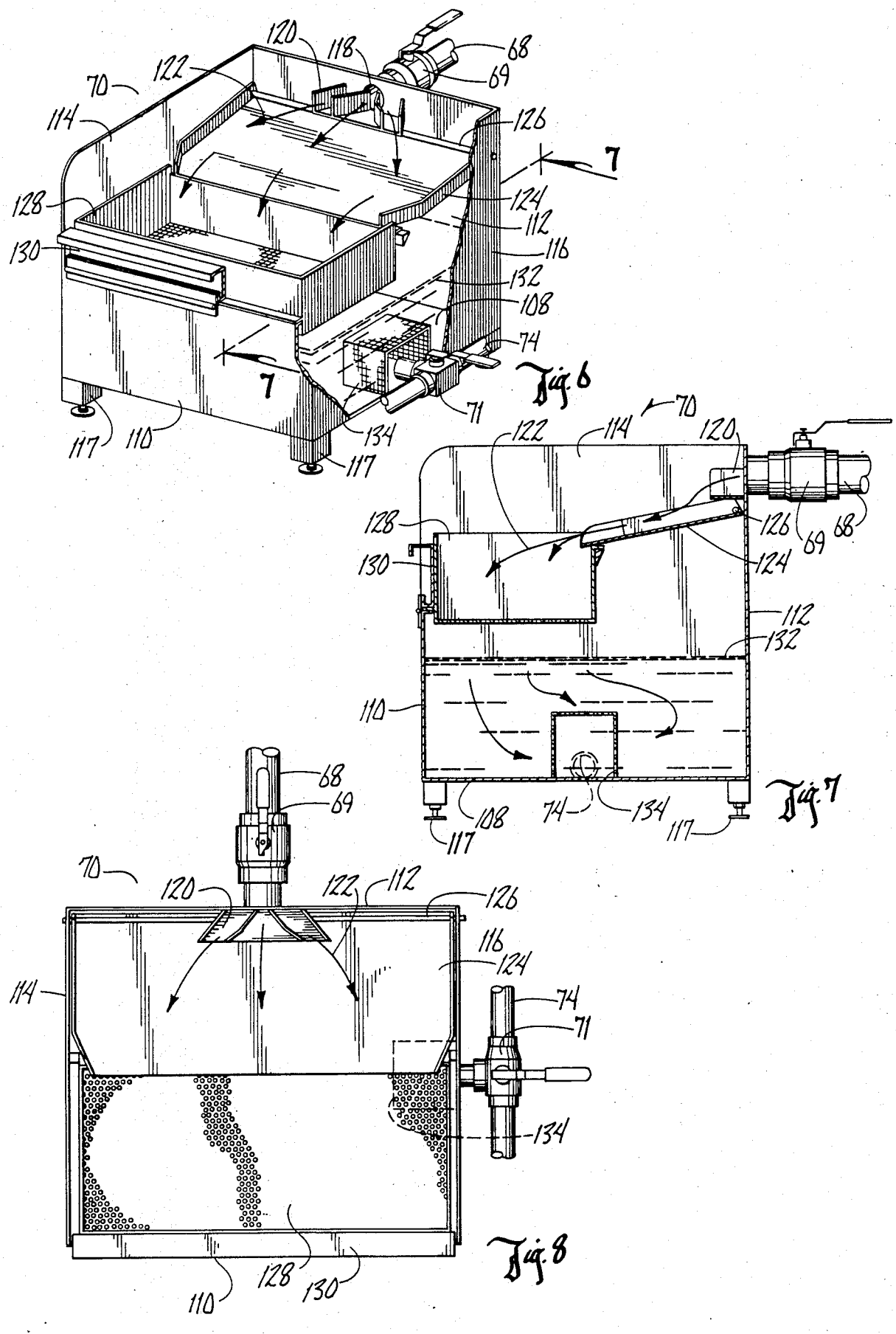

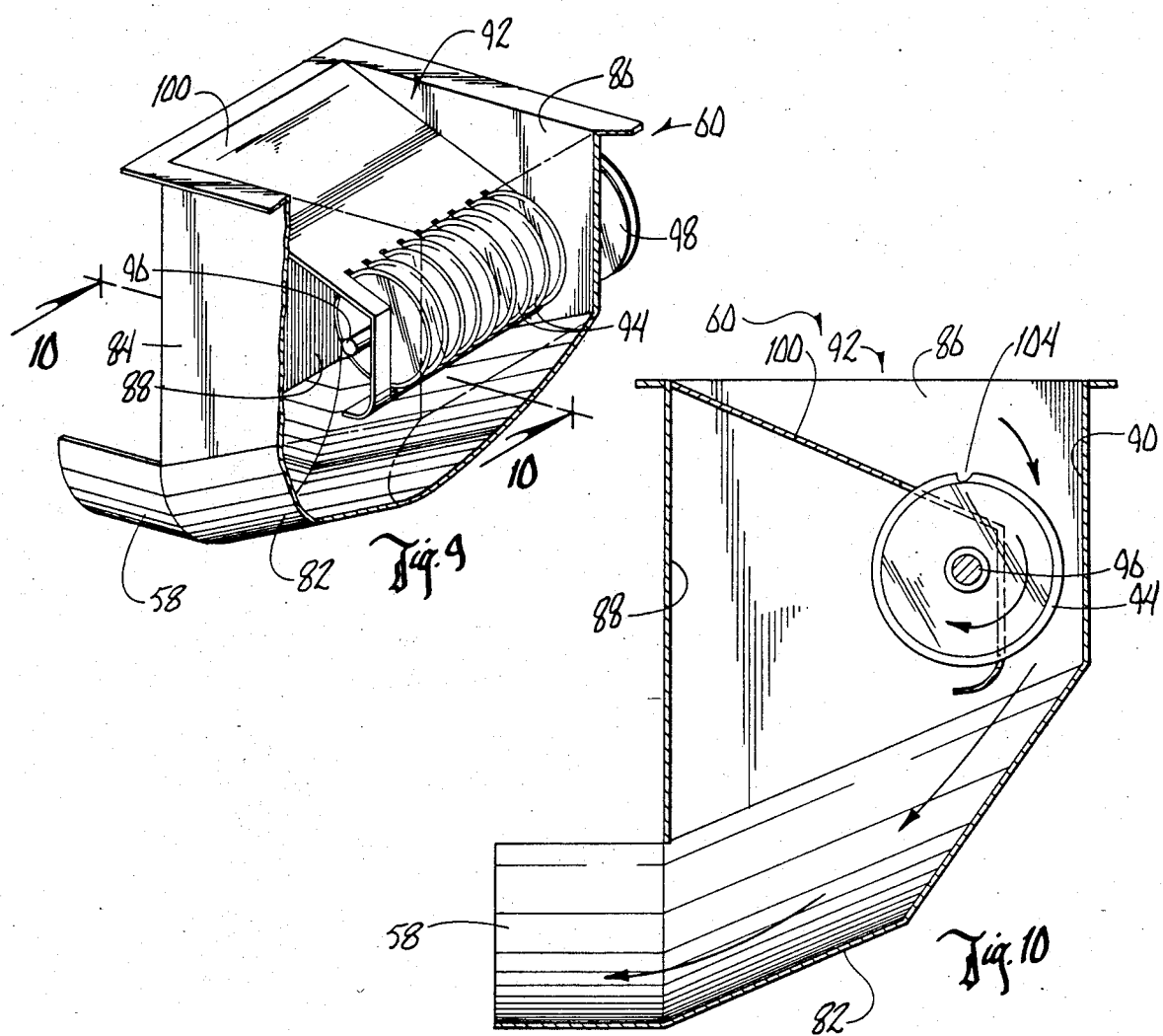
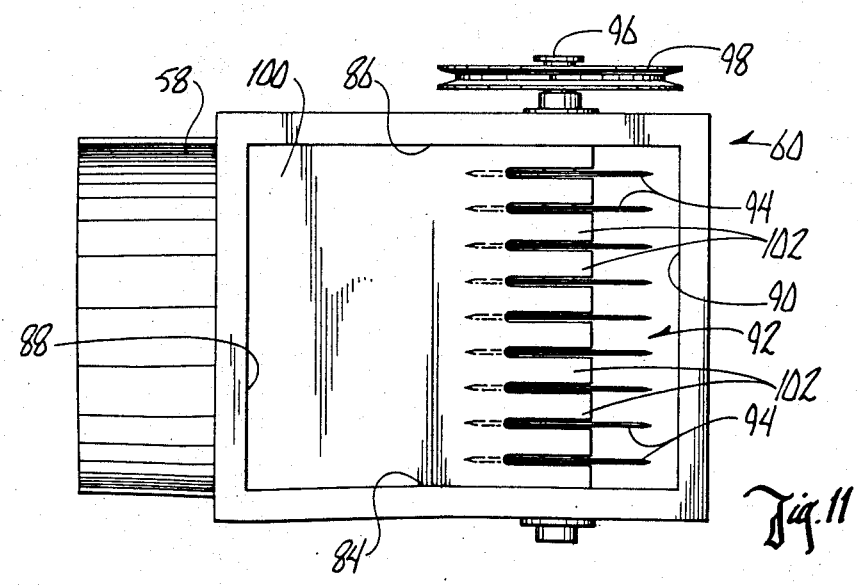

BY-PRODUCT CHILLER AND METHOD FOR USING SAME

BACKGROUND OF THE INVENTION

Packing plant by-products, such as lungs, kidneys, hearts and other parts generally not consumed by humans, are often sold and used to make pet food. These by-products are initially at the body temperature of the butchered animal when removed therefrom, and are therefore highly susceptible to spoilage. Due to such potential for spoilage, the by-products have a very short life. The warm by-products must be quickly transported from the packing plant which slaughters the animal to the remote processing plant for conversion into pet food. Without such hurried pick up and delivery, the by-products become spoiled and must be discarded.

In a prior application, Ser. No. 746,241, filed June 18, 1985, now United States Letters Pat. No. 4,578,957, it was a primary objective of the invention to provide an on-site by-products chiller for lowering the temperature of fresh by-products, and thereby reducing potential for spoilage. See also U.S. Pat. No 4,577,466, issued Mar. 25, 1986.

A further objective of the prior invention of U.S. Pat. No. 4,578,957 was the provision of an on-site method and apparatus for chilling by-products which would prolong the life of by-products for further processing.

Thus, the method and apparatus of the prior invention for chilling animal by-products at the point of slaughter allows the by-products to be stored without spoilage prior to being shipped for further processing.

This invention represents an improvement over the prior invention in several respects. importantly, in order to prevent spoilage of the hot slaughterhouse by-product, it is necessary that it be cooled as quickly as possible. It has now been found that cooling is substantially enhanced and thus the on-site by-products chiller substantially improved, if the slaughterhouse by-product is substantially size reduced, or in other words, slashed or cut, either prior to or simultaneously with, entry into the chiller. Thus, one primary objective of the improved chiller of the present invention is to provide an apparatus which will allow slashing of the slaugherhouse by-product as it enters the chiller, thereby substantially enhancing the cooling and chilling objectives of the apparatus. This, therefore, is a significant objective of the present invention.

Another improvement represented by the present invention relates to the inherent problems involved with the materials treated. Often the slaughterhouse by-product, such as lungs, kidneys and hearts have extraneous associated materials such as hair, fat, skin and the like. While ordinarily small amounts of these materials can be tolerated in pet foods, such materials, particularly fat globules when subjected to the chilling process change their consistency, and become more adherent in nature. They therefore tend to harden and coalesce, plugging the holes within the chiller drum, thus preventing effective circulation of the chilling liquid. It is therefore a primary objective of the improved chiller and method of the present invention to provide a strainer system which allows the fat globules and other extraneous material to be strained from the coolant prior to recirculation. In this manner the interfering material can be eliminated, quality of the by-product improved, and the chilling apparatus performance characteristic significantly enhanced. Thus, this is a second primary objective of the present invention.

A third and further improvement objective of the present invention is to provide a fluid level control float system which better allows maintenance of the chilling liquid within an effective, continuous flow circuit, without any surges, or dry pump operation, while at the same time maintaining pressure in a relatively constant manner. This simply allows liquid circulation, and thus cooling in a more efficient manner.

SUMMARY OF THE INVENTION

This invention relates to improvements in an on-site chilling apparatus, and the method of using the apparatus, wherein packing plant slaughter materials such as lungs, kidneys and hearts are immediately cooled on-site, thus preventing spoilage, and therefore improving the quality of the materials for transport and use in making pet foods. The basic chilling apparatus employs a rotating drum with a chilling liquid continuously circulated through the drum, with the packing plant by-product being passed through the drum. In the improvements of the present invention, the chiller has an associated slashing unit for subdivision of the slaughterhouse by-product either prior to, or simultaneously with, entry into the rotating drum. In this manner more surface is exposed, and chilling accomplished more quickly and more efficiently.

In another improvement of the present invention a strainer unit is provided for the rotating drum to allow straining of extraneous materials such as fat globules, thereby preventing plug-up of spray nozzles and perforations in the rotating drum, thus eliminating a significant problem to effective by-product cooling. In a third improvement, floats are provided in the chilling storage tank in order to maintain the fluid level within the system, to prevent surges, and significant pressure changes.

BRIEF DESCRIPTION OF THE DRAWINGS

FIG. 1 is a plan view of the improved by-products chiller tank of the present invention.

FIG. 2 is an elevated side view of the improved chiller unit.

FIG. 6 shows in detail the screening unit assembly, or strainer for straining undesirable materials, particularly fat globules from the cold chilling liquid.

FIG. 7 is an end view, with parts broken away, along line 7—7 of FIG. 6.

FIG. 8 is a plan view of the strainer.

FIG. 9 is an elevated view, with parts broken away of the slasher unit.

FIG. 10 is a sectional view along line 10-10 of FIG. 9 showing operational details of the slasher unit.

FIG. 11 is a plan view of the slasher unit of FIG. 9.

DETAILED DESCRIPTION OF THE INVENTION

Figure 3:
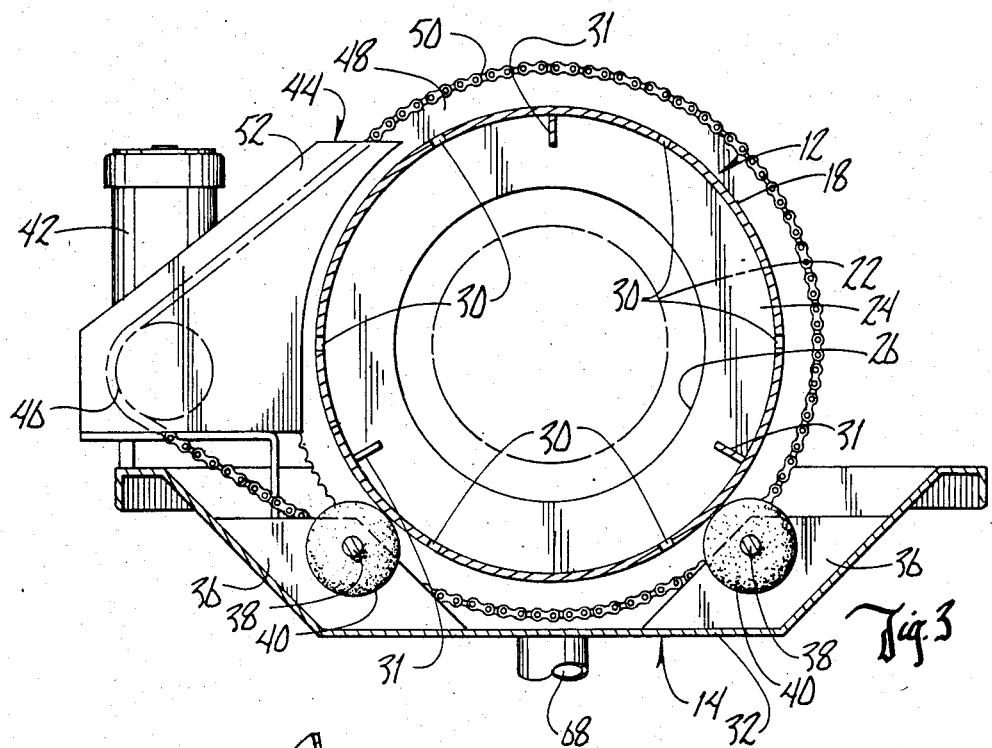
FIG. 3 is an end view, with the slasher unit removed, taken along line 3—3 of FIG. 1.

For clarity of description, a by-products chiller generally is first described, before describing the improvement of the present invention. Chiller 10 is located at the packing plant where the animals are slaughtered, and basically comprises an elongated chilling tank 12 rotatably mounted above a drainage trough 14 and a liquid coolant supply source 16.

Tank 12 includes a cylindrical body 18 having a first end 20 with an inlet opening 22 therein and a second end 24 with an outlet opening 26 therein. Body 18 of tank 12 is of single wall construction and has a plurality of apertures 30 therein for draining liquid coolant from the tank. Tank 12 also has a plurality of baffles 31 extending inwardly from the interior of body 18 along the length thereof.

Trough 14 includes a large receptacle 32 mounted upon a plurality of legs 34 and positioned beneath tank 12. Each end of receptacle 32 has two pairs of depending ears 36 extending inwardly therefrom, each pair of which supports an axle 38 upon which a trunnion wheel 40 is rotatably mounted. Each pair of trunnion wheels 40 at each end of receptacle 32 are positioned one on each side of the longitudinal axis of tank 12 and support tank 12 for rotation thereon. Legs 34 may be adjustable such that tank 12 may be inlined along its longitudinal axis.

Chiller 10 includes a means for rotating tank 12 about its longitudinal axis as it is supported by trunnion wheels 40. The rotation means generally comprises a motor 42 and a chain and sprocket assembly 44. More particularly, motor 42 is mounted upon trough 14 and has a first sprocket 46 conventionally and operatively connected thereto. A second sprocket 48 is fixed about the perimeter of tank body 18. A chain 50 drivingly interconnects first sprocket 46 and second sprocket 48 such that actuation of motor 42 causes tank 12 to rotate about its longitudinal axis. A housing 52 is attached to trough 14 so as to cover first sprocket 46 and at least a portion of chain 50 for safety purposes.

Figure 4:
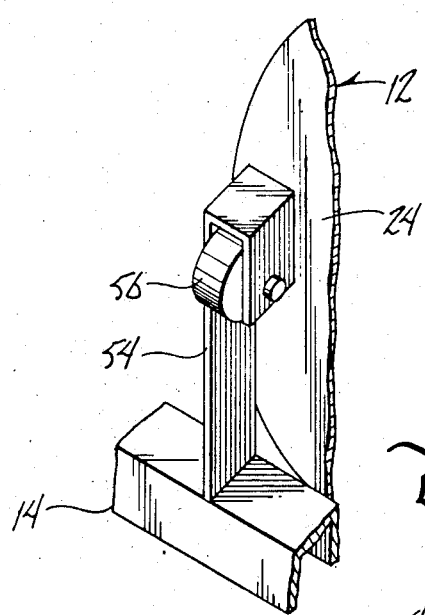
FIG. 4 is a fragmentary view showing the guidance rollers of the tank in greater detail than shown in FIG. 2.

Also mounted upon cylinder 12 is a bracket 54 to which is bolted a guide roller 56, as seen in FIG. 4. Guide roller 56 engages opposite ends of the cylinder 12 so as to prevent tank 12 from moving longitudinally as the tank rotates upon trunnion wheels 40.

An inlet chute 58 extends through inlet opening 22 so as to deposit animal by-products from the slasher unit, generally referred to at 60 (FIG. 9) to the interior of tank 12. The by-products are removed from tank 12 via an outlet chute 62 extending from outlet opening 26 of tank 12.

Figure 5:
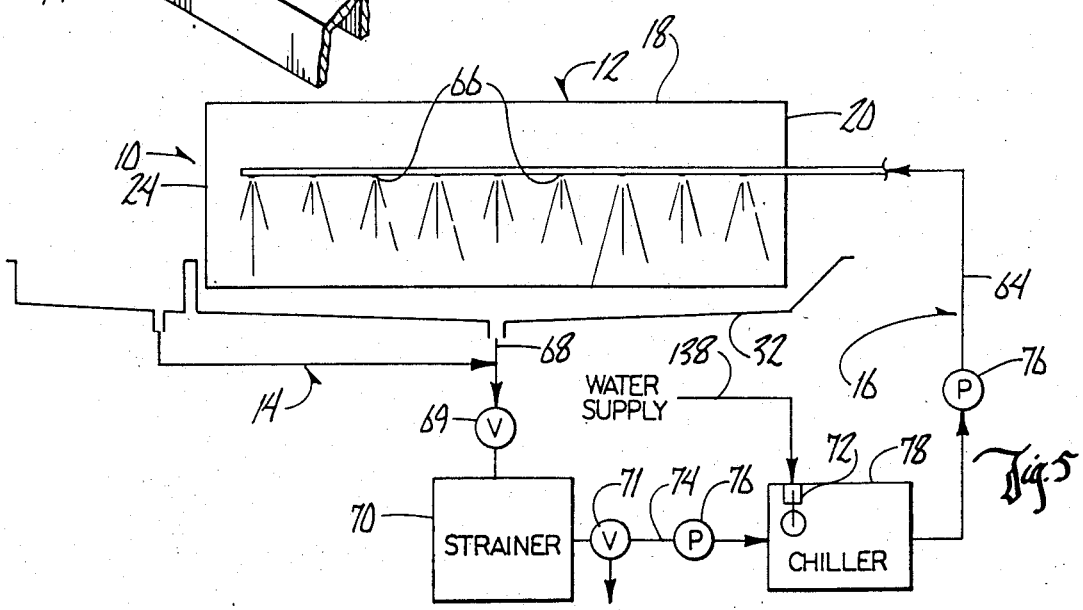
FIG. 5 is a schematic showing inter alia, the liquid circulation system, as well as the fluid control means.

A coolant supply line 64 extends from coolant source 16 at least to chute 58 and supplies a liquid coolant, such as water, from coolant source 16. In the embodiment shown in FIGS. 1–4, coolant supply lines 64 terminates adjacent first end 20 of tank 12, however as seen in FIG. 5, line 64 may extend along the length of tank 12 and include a plurality of spray nozzles 66 for uniform distribution of coolant throughout tank 12.

Trough 14 also includes a drain 68 for draining coolant from receptacle 32. Valve 69 on line 68 controls drainage into screen box 70. Float valve 72 controls the liquid level. A coolant return line 74 is connected to drain 68 at one end and to coolant source 16 at the other end. Pumps 76 are disposed on return line 74 and supply line 64 for pumping coolant from receptacles 32 to coolant source 16 and from chiller 78 to tank 12. The screen box 70 is later described. The coolant is re-cooled in chiller 78 and pumped to the return line 16. The coolant which is passed through tank 12 and trough 14 is therby recirculated back to coolant source 16, wherein it is cooled for subsequent reuse in chilling additional by-products. Chiller 78 has an associated flat valve 72 (earlier mentioned) which controls the liquid level, and can be adjusted to cooperatively work with pumps 76 to maintain the desired fluid level to prevent surge flow.

In the packing plant chilling operation in these units generally, a quantity of fresh animal by-products are deposited on inlet chute 58 and slasher unit 60 (later described) slashes the material wherein it passes through inlet opening 22 into tank 12. Liquid coolant at approximately 33° F. from coolant source 16 passes through chiller 78 is also introduced into tank 12 for lowering the temperature of the hot by-products. Tank 12 is rotated upon trunnion wheels by motor 42 and chain and sprocket assembly 44. Such rotation of tank 12 causes the by-products therein to tumble so as to be completely exposed to the lower temperature coolant. Baffles 32 facilitates the tumbling of the by-products. Introduction of addition by-products and coolant pushes the previously intoduced by-products through tank 12 and out outlet opening 28 onto outlet chute 62 wherein by-products are removed for later processing into pet food or the like.

As heretofore mentioned, it has been found that a significant improvement in cooling effectiveness will be achieved when the unit employs in conjunction with the entry end 20 of tank 12, a slasher unit 60 (FIGS. 9-11). The slasher unit 60 has as its bottom wall 82 an extension of tank entry chute 58. This may be an interval extension and the same piece, or may be a separate piece. Bottom wall 82 extends rearwardly and upwardly from entry end 22 as depicted in FIG. 10. Adjoining bottom wall 82 and spaced apart therefrom are sidewalls 84 and 86 of the slasher unit. Also adjoining the bottom wall 82 at its most rearward end are spaced apart front and back walls 88 and 90 of slasher unit. As can be seen in FIGS. 9 and 10, the unit has an open top 92. Thus, bottom wall 82, sidewalls 84 and 86, and forward and rear walls 88 and 90 form what might be described as an entry hopper. Mounted within the slasher unit for rotary movement are a plurality of circular slashing blades 94, each rigidly attached to blade shaft 96. Blade shaft 96 is rotatably journaled within sidewall 86 and has an associated power drive pulley 98. By-product slide 100 extends downwardly and inwardly from the back wall 88 to the slasher blades 94. Blades 94 are positioned within the slasher unit 60 such that they are spaced away from forward wall 90 only sufficiently far that by-product may simultaneously engage the interior of wall 90 and the edges of blades 94. As can be seen best in FIGS. 9 and 11, it is preferred that entry slide 100 terminate at its forward end in a plurality of spaced-apart fingers 102, each of which extend into the interior gap defined on its boundaries by the respective spaced-apart blades 94. In this manner it is assured that by-product will not circumvent the slasher unit. In actual operation the slasher unit works as follows. By-product is dumped into the hopper portion of the slasher unit and falls upon slide 100. Because slide 100 is tilted downwardly, gravity directs the material down the slide. The material, because of the position of the slide and its orientation cannot avoid blades 94. Blades 94 are rotating by motor 97, which operates driven pulley 98, and correspondingly rotates blades 94. Blades 94 engage the by-product and slash and cut the same. Any by-product not immediately slashed by the circular blades 94 is carried forward in the direction of the arrow shown in FIG. 10, and sandwiched between wall 90 and the edge of blade 94, wherein it is cut.

Notch 104 in each circular blade 94 enhances the opportunity for engagement between the cutting edge of the blade and by-product. It can thus be seen that it is impossible for the by-product to by-pass blades 94. The material falls off of blades 94 onto bottom wall 82 and from there forward into entry chute 58 and then into the chiller. Material which has been slashed by this associated slasher unit enters into the chiller with more surface exposed, in smaller pieces which can be easily treated, and as a result is more efficiently and economically chilled, and less susceptible to spoilage.

Slashed by-product material now passes through the rotating tank 12, in the manner earlier described. Because the material is cold chilled, fat globules become firmer and thus have more adherent or sticky characteristics. The result is that there is a propensity for chiller unit 10 to have apertures 30 and spray nozzle 66 plugged as the fat materials become cooled and cooler and continually recirculate. In a second improvement of the present invention, such tendency is eliminated by the associated strainer mechanism, referred to generally at 70, and shown in detail in Figures 6, 7, and 8. As shown in the view of FIG. 1, strainer 70 is associated with drain line 68 and shut off valve 69. Thus, material draining from trough 14 drains into line 68 at the rate controlled by the opening on valve 69 and directly into strainer 70.

Strainer 70 is a box having a bottom 108, and associated front and back walls 110 and 112 and side walls 114 and 116. Adjustable legs, which are all like numbered 117, allow for level adjustment of the strainer unit 70. Drain line 68 passes through opening 118 in the back wall 112 of the strainer unit and terminates in a plurality of flow directors 120 which direct the fluid in the manner depicted by arrows 122. The material falls onto an associated splasher tray 124 which is mounted via support rod 126 in pivotal fashion to sidewalls 114 and 116. Thus, if desired, splasher 124 may be moved upwardly and away from the strainer to a nonuse position. The most forward end of splasher 124 rests in abutting relationship against the top edge of strainer screen 128. Strainer screen 128 is mounted as shown in FIG. 7 to front wall 110 via bracket 130. Thus, material which splashed onto pan 124 thence falls into screen 128 wherein fat globules and other undesired materials are strained therefrom, with the resulting now clean coolant going through the bottom of strainer box 70 via screen 128 to form liquid level 132. Return line 74 has valve 71 which may be open to control exit flow into return line 74. Screen 134 surrounds the entrance into line 74 via valve 71 as a further assurance of effective screening of undesired materials. If the system is shut down, as it must be from time to time for screen cleaning, a splasher tray 124 can be tilted upwardly and away from strainer screen 128 and if need be, screen 128 can be lifted out via bracket 130, cleaned, and reinserted.

It thus can be seen that the invention accomplishes at least all of its stated objectives.

What is claimed is:

1. A by-products chiller having an elongated revolvable cylindrical tank with an inlet end for introducing fresh animal by-products into said tank and an outlet end for removing said by-products from said tank, and means for circulating cooling liquid through said tank, the improvement comprising:
   an associated by-products mechanical slashing unit through which all by-products must first pass prior to entry into said chiller whereby said by-products are cut to increase the surface area thereof; said slashing unit including a plurality of spaced apart driven blades, and an entry hopper having a top opening and side walls, said blades being positioned within said hopper to allow by-products to be simultaneously pressed against the blades and at least one side wall of said hopper;
   means providing communication between said slasher unit and said inlet end of said tank.

2. The by-products chiller of claim 1 wherein said slashing unit further comprises an associated by-products slide extending from one side of said top opening to said spaced apart driven blades.

3. The by-products chiller of claim 1 wherein said blades are circular, notched blades.

4. A by-products chiller having an elongated revolvable cylindrical tank with an inlet end for introducing fresh animal by-products into said tank and an outlet end for removing said by-products from said tank, and means for circulating cooling liquid through said tank, the improvement comprising:
   an associated strainer unit for straining substantially all undesired fatty materials and the like from said cooling liquid prior to circulating the same, said strainer unit comprising a coolant holding tank, a removable strainer basket, an associated splash plate for directing inlet coolant to said strainer basket, and an associated coolant outlet.

5. The by-products chiller of claim 4 wherein said coolant outlet is covered by a straining screen.

6. The by-products chiller of claim 4 wherein said coolant holding tank has an associated flat valve for control of the coolant level within the circulating cooling liquid system of said chiller.

7. A method of preserving fresh animal by-products which are to be further processed, comprising:
   introducing the fresh by-products into a hopper having a top opening and opposite sides, and a plurality of driven blades mounted therein;
   mechanically slashing the fresh by-products into subdivided pieces having increased surface area by moving the by-products into simultaneous engagement with the blades and at least one side wall of the hopper;
   introducing slashed warm by-products into an elongated chilling tank at the slaughter vicinity; introducing liquid coolant from a coolant source into said tank;
   rotating said tank such that said by-products are tumbled therein for exposure to said coolant whereby heat is transferred from said by-products to said coolant thereby chilling said by-products to eliminate spoilage thereof;
   recirculating said coolant to said coolant source for re-cooling thereby whereafter said coolant is re-used for chilling additional by-products;
   storing the chiller by-products at the slaughter vicinity until said chilled by-products are transported for further processing.

8. The method of claim 7 further comprising continuously draining said coolant from said tank during rotation thereof.

9. The method of claim 8 wherein said coolant is drained from said tank through a plurality of apertures therein.

10. The method of claim 7 wherein introduction of additional by-products into said tank forces the previously introduced by-products through said tank.

11. The method of claim 7 wherein said introduction of said coolant into said tank forces said by-products through said tank.

12. The method of claim 7 wherein said coolant is introduced into said tank through a plurality of spray nozzles positioned therein.

13. The method of claim 7 further comprising agitating said by-products to facilitate chilling thereof by said coolant.

14. The method of claim 7 wherein the temperature of said coolant from said coolant source is approximately 33° F.

15. The method of claim 7 wherein said by-products remain in said tank for approximately 10-12 minutes.

16. A method of preserving fresh animal by-products which are to be further processed, comprising:

introducing warm by-products into an elongated chilling tank at the slaughter vicinity;

introducing liquid coolant from a coolant source into said tank;

rotating said tank such that said by-products are tumbled therein for exposure to said coolant whereby heat is transferred from said by-products to said coolant thereby chilling said by-products to eliminate spoilage thereof;

draining said coolant from said tank into a coolant holding tank;

straining said drained coolant through a removable strainer basket mounted in said holding tank to remove fat globules and other adulteratng materials from said by-products;

recirculating said strained coolant to said coolant source for re-cooling thereby whereafter said coolant is reused for chilling additional by-products;

storing the chilling by-products at the slaughter vicinity until said chilled by-products are transported for further processing.

* * * * *